Sept. 28, 1954   J. D. GILES   2,690,351
KNOCKDOWN TYPE COVER FOR VEHICLE BODIES
Filed Sept. 8, 1952   2 Sheets-Sheet 1
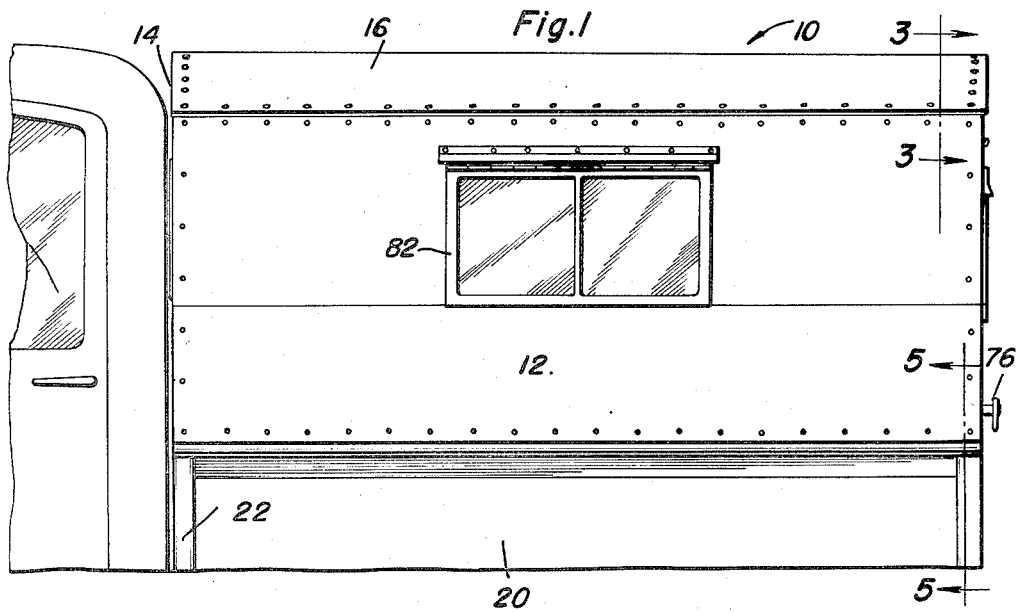
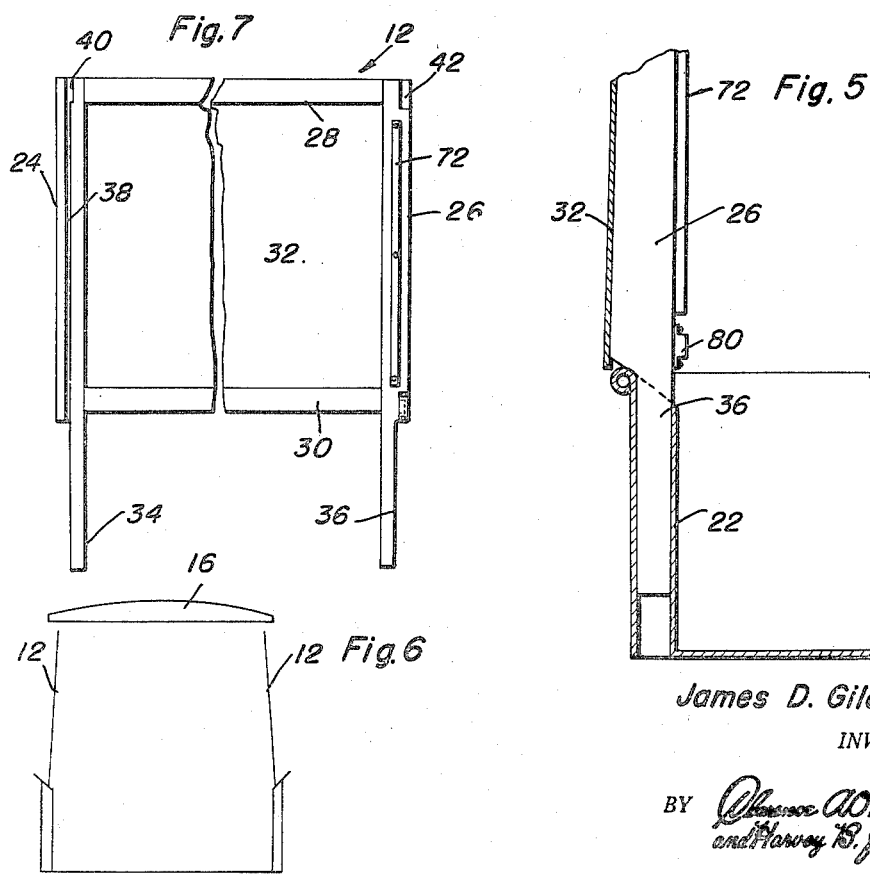
James D. Giles
INVENTOR.

Sept. 28, 1954　　　　　J. D. GILES　　　　　2,690,351
KNOCKDOWN TYPE COVER FOR VEHICLE BODIES
Filed Sept. 8, 1952　　　　　　　　　　　　　　2 Sheets-Sheet 2
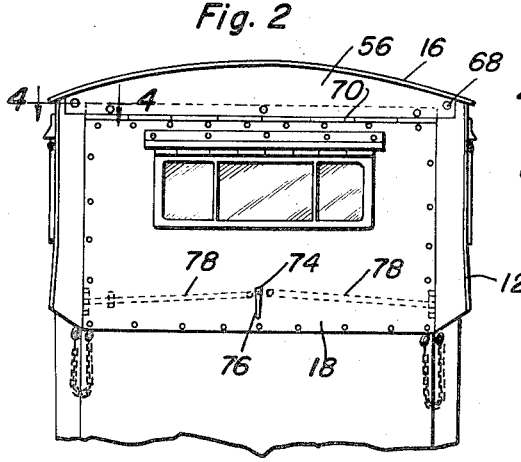
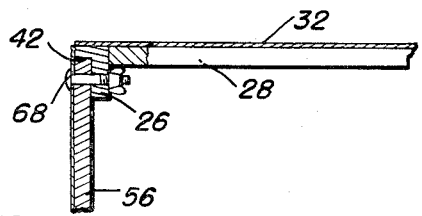
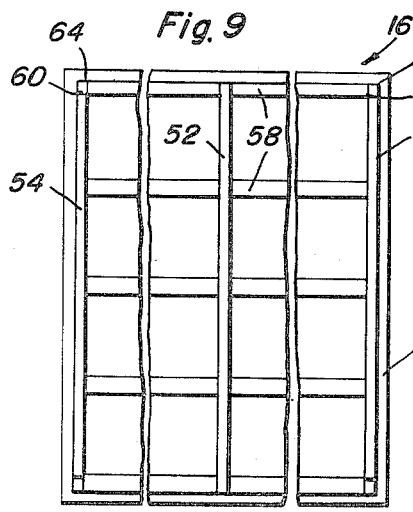
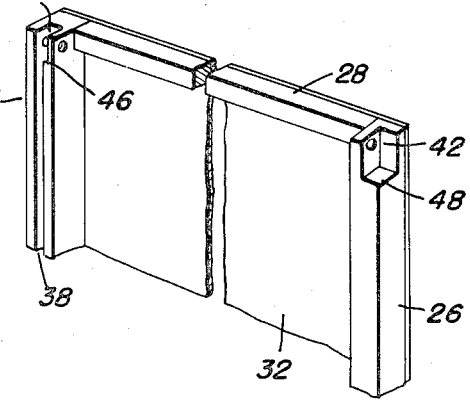
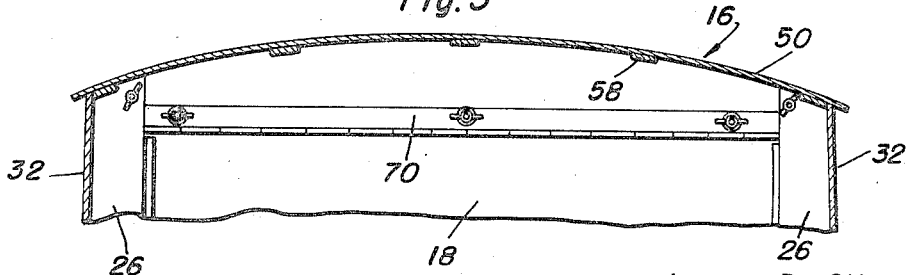
James D. Giles
INVENTOR.

Patented Sept. 28, 1954

2,690,351

UNITED STATES PATENT OFFICE 2,690,351

KNOCKDOWN TYPE COVER FOR VEHICLE BODIES

James D. Giles, Los Angeles, Calif.

Application September 8, 1952, Serial No. 308,353

6 Claims. (Cl. 296—102)

1

The present invention relates to demountable shelters or covers and more particularly relates to covers for the beds of automotive vehicles such as pick-up trucks and the like.

The primary object of the invention is to provide a demountable cover for pick-up trucks or the like that is extremely light, rigid, easily assembled and dismantled and which is made in sections whereby it may be stored in a very small area.

Another object of the invention is to provide a shelter for pick-up truck beds and the like that, although constructed in sections, contains very few and easily accessible fasteners for securing the same together.

A last object of the invention to be mentioned specifically and a very important object thereof is the provision of a cover of the above described character having side panels with bowed feet adapted to extend into the post holes of a pick-up truck body whereby the upper ends of the side panels converge toward one another thereby necessitating forcing the roof between the side panels to place the same in parallel relation to one another and to form a weather-tight seal between the roof and the side panels.

These, together with various ancillary objects and features of the invention, which will become apparent as the following description proceeds, are attained by this invention, a preferred embodiment of which is shown by way of example only in the accompanying drawings, wherein:

Figure 1 is a side elevational view of the cover mounted on a pick-up truck bed;

Figure 2 is a rear end view of the cover mounted on a pick-up truck body;

Figure 3 is a sectional view of a portion of the upper end of the cover taken substantially along section line 3—3 of Figure 1;

Figure 4 is an enlarged sectional view of the connection between the rear end of one of the side panels and the roof taken substantially along section line 4—4 of Figure 2;

Figure 5 is a sectional view taken along section line 5—5 of Figure 1 disclosing the mounting of the side panels in the post holes of the pick-up truck body;

Figure 6 is a diagrammatic view of the side panels with the roof raised therefrom showing the bowed frame members of the side panels;

Figure 7 is a rear elevational view of one of the side panels;

Figure 8 is a perspective view in enlarged detail of the upper portion of one of the side panels; and,

2

Figure 9 is an elevational view of the roof of the cover.

Referring now to the accompanying drawings in detail wherein like reference characters are utilized to designate like parts throughout the various views, the numeral 10 designates the cover or shelter in its entirety.

The cover 10 comprises a pair of side panels 12, a front end panel 14, a roof 16, and a rear door 18. 20 represents the sides of a pick-up truck body having the tubular post sockets 22 therein. As is clearly evident from Figure 1, the cover 10 is mounted in the post sockets 22 of the pick-up body sides 20 to overlie the bed of the truck.

Referring to Figures 7 and 8, the construction of the side panels 12 may be readily observed. These panels 12 are constituted of a substantially rectangular frame comprised of vertical end members, a top cross member 28 interconnecting the upper ends of the end members, and an intermediate cross member 30 interconnecting the end members intermediate their ends. A panel of hard, fiberboard of suitable variety that is weather-resistant 32 is secured at its edges to the end members 24, 26 and the cross members 28, 30. Feet 34 and 36 depend from the front and rear end members 24 and 26, respectively, and are disposed in the post sockets 22 of the side walls 20 of the pick-up truck body. With reference to Figure 6, it will be noted that these feet 34 and 36 are bowed inwardly with respect to the major plane of the side panels for a purpose that will later become apparent.

The front end members 24 of the side panels 12 are formed with opposing, vertical grooves 38 in which the edges of the front panel 14 are slidably disposed. At the upper end of each of the front end members 24 a notch or recess 40 is formed opening into the groove 38. The rear end members 26 likewise each have a notch 42 formed in the upper end thereof, these notches 40 and 42 forming offset shoulders 46 and 48 upon which the roof 16 seats in a manner to be described.

The roof 16 comprises a hard, weather-resistant panel member 50 of any suitable material having a central reinforcing rib 52 and front and rear reinforcing ribs 54 and 56, respectively, which ribs are in the form of arch members. Purlins 58 extend longitudinally across the panel 50 to stiffen the same throughout its length. The end ribs 54 and 56 are formed with offset shoulder portions 60 and 62, respectively, whereby the ends of the ribs 54 and 56 terminate in tongues 64 and 66, respectively.

To mount the roof 16 on the side panels 12, the tongues 64 of the front rib 54 are seated in the notches 40 behind the front panel 14 which is first slidably inserted in the grooves 38 to spread the side panels 12 from bowed relation to one another. When thus seated, the offset shoulder portions 60 of the rib 54 abut the inner surfaces of the front end members 24. Aligned apertures are formed in the front panel 14, front end member 24 and tongues 64 of the roof rib 54 whereby a single fastener may be utilized to securely unite the mating corners of these members to one another. In this condition, it will be noted that the bow is not yet removed from the rear end members 26 and this is accomplished by forcing the ends of the center rib 52 against the inner surfaces of the upper cross members 28 and then forcing the tongues 66 of the rear end rib 56 into seating engagement in the notches 42 on the shoulder 48 whereby the offset shoulders 62 formed on the rear rib 56 are brought into abutting engagement with the inner surfaces of the rear end members 26. By this particular arrangement, a force fit is obtained between the roof and the side panels which affords an extremely weather-tight seal and generally promotes a very tight body structure. Aligned apertures are formed in the upper end of each member 26 and its associated tongue 66 and a suitable headed fastener 68, having a wing nut threaded on the inner end thereof extends through these aligned apertures to secure the rear rib 56 to the rear end members 26.

The door 18 is hinged to the lower edge of the rear rib 56 for vertical swinging movement by the piano hinge 70. To facilitate ease of storage, the piano hinge 70 is fixedly secured to the door 18 and detachably secured to the lower edge of the rib 56 of the roof.

To provide a stop for the vertically swinging door 18 and to further assure a weather-tight seal of the door against the side panels 12, each of the rear end members 26 is provided with a longitudinally extending strip of metal, wood or other suitable material against which the door seats. To securely maintain the door in its closed position, a latch means 74 is provided.

The latch means 74 comprises generally a central handle 76 to which is secured a pair of levers 78 extending to opposite side edges of the door 18. The ends of the levers 78 abut the keeper brackets 80 mounted on the inner surface of each of the rear end members 26 (note Figure 5).

Windows of any suitable nature as shown at 82 may be provided in the side and front panels as well as the rear door 18 in accordance with the desire of the builder.

The cover described above for pick-up truck bodies and the like is exceptionally adaptable for camping trips as will be readily apparent in addition to its function as serving as a protector of material to be hauled in the truck bed from the elements. In actual practice, the cover may be assembled in place on the truck body or demounted therefrom in as little as ten minutes by a single individual.

From the foregoing description, it is believed that the device will be clearly understood. However, since numerous modifications and changes will readily occur to those skilled in the art after a consideration of the foregoing specification taken in conjunction with the accompanying drawings, it is not desired to limit the invention to the exact construction shown and described; but, all suitable modifications may be resorted to falling within the scope of the appended claims.

Having thus described the invention, what is claimed as new is:

1. A demountable cover for vehicle bodies comprising a front panel, side panels, a roof and a rear door, feet depending from said side panels for securing the same to a vehicle bed, said feet being angulated inwardly from the plane of said side panels, the front ends of said side panels having vertical grooves, the edges of said front panel being slidably received in said grooves and spreading the forward portions of the side panels into alignment with the side panel feet, said roof fitting over said side panels and front panel, portions of said roof projecting between said side panels and forcing the rear portions of said side panels into alignment with said feet, and means extending through the abutting portions of said roof and panels detachably securing said panels and roof to one another.

2. A demountable cover for vehicle bodies including a front panel, side panels and a roof, each side panel including front and rear vertical end members, feet integrally depending from said end members and being bowed inwardly from the plane of each side panel, said front end members having vertical grooves therein, said front panel being slidably received in said grooves and spreading the forward portions of the side panels into alignment with the side panel feet, said roof including spaced bracing ribs fitting between said side panels and spreading the rear portion of the side panels apart, and means detachably securing said roof and front panel to said front vertical end members.

3. A demountable cover for vehicle bodies including a front panel, side panels and a roof, each side panel including front and rear vertical end members, feet integrally depending from said end members and being bowed inwardly from the plane of each side panel, said front end members having vertical grooves therein, said front panel being slidably received in said grooves and spreading the forward portions of the side panels into alignment with the side panel feet, said roof including spaced bracing ribs fitting between said side panels and spreading the rear portions of the side panels apart, and means detachably securing said roof and front panel to said vertical end members, said means including said front end members having recesses in the upper ends thereof opening into said grooves and forming offset shoulders, the front rib of said roof seating in said recesses, said front rib, front end members and said front panel having aligned apertures therein, fasteners extending through said apertures.

4. A demountable cover for pick-up trucks and the like including a pair of side panels and a roof, reinforcing frames on said side panels including vertical end members, feet on said end members depending below said panels and adapted to be disposed in the post sockets of a pick-up truck body, said feet being angulated inwardly from the plane of each side panel, transversely extending ribs at the ends of said roof, the ends of said ribs having offset portions forming tongues, the upper ends of said end members being notched and said tongues fitting in said notches, the upper ends of said end members and said tongues having aligned apertures, fasteners extending through said aligned apertures and securing said roof to said side panels, the ends of said ribs abutting said end members and forcing the side panels into substantially parallel positions.

5. A demountable cover for pick-up trucks and the like including a pair of side panels and a roof, reinforcing frames on said side panels including vertical end members, feet on said end members depending below said panels and adapted to be disposed in the post sockets of a pick-up truck body, said feet being angulated inwardly from the plane of each side panel, transversely extending ribs at the ends of said roof, the ends of said ribs having offset portions forming tongues, the upper ends of said end members being notched and said tongues fitting in said notches, the upper ends of said end members and said tongues having aligned apertures, fasteners extending through said aligned apertures and securing said roof to said side panels, the ends of said ribs abutting said end members and forcing the rear portions of said side panels into substantially parallel positions, one set of end members having vertical grooves therein, the notches in the upper ends of said set of end members opening into said grooves, a front panel slidably mounted in said grooves and spreading the forward portions of said side panels into substantially parallel relation with one another.

6. A demountable cover for vehicle beds including a pair of side frames and a roof, said side frames including vertical front and rear end members and transverse members interconnecting said end members, the upper ends of said end members having notches therein, transverse ribs on said roof and tongues on the ends of said ribs, said tongues fitting in said notches, said end members being bowed inwardly at their lower ends and urging said side frames against said roof ribs, and a covering on each of said side frames, the front end members on said side frames having vertical, inwardly opening grooves therein, an end panel slidably disposed in said grooves.

References Cited in the file of this patent

UNITED STATES PATENTS

| Number | Name | Date |
|---|---|---|
| 743,291 | Kimble | Nov. 3, 1903 |
| 993,796 | Repetto | May 30, 1911 |
| 1,233,319 | Groce | July 17, 1917 |
| 1,263,298 | Weber | Apr. 16, 1918 |
| 1,393,071 | Baxter | Oct. 11, 1921 |
| 1,427,660 | Voltz et al. | Aug. 29, 1922 |
| 1,805,461 | Kubler | May 12, 1931 |
| 1,809,348 | Milner | June 9, 1931 |
| 1,894,356 | Lewis | Jan. 17, 1933 |

FOREIGN PATENTS

| Number | Country | Date |
|---|---|---|
| 467,962 | Great Britain | June 25, 1937 |